United States Patent [19]

Winsche

[11] 4,231,771
[45] Nov. 4, 1980

[54] DISPERSOID SEPARATION METHOD AND APPARATUS

[75] Inventor: Warren E. Winsche, Bellport, N.Y.

[73] Assignee: The United States of America as represented by the United States Department of Energy, Washington, D.C.

[21] Appl. No.: 901,047

[22] Filed: Apr. 28, 1978

[51] Int. Cl.³ .............................................. B01D 45/12
[52] U.S. Cl. .................................. 55/408; 55/459 R
[58] Field of Search .............................. 55/400–409, 55/459 R; 233/DIG. 1, 31, 37

[56] References Cited

U.S. PATENT DOCUMENTS

| | | | |
|---|---|---|---|
| 403,701 | 5/1889 | Seck | 55/403 |
| 1,057,613 | 4/1913 | Baldwin | 55/407 |
| 2,779,434 | 1/1957 | Smith | 55/408 |
| 2,791,158 | 5/1957 | Polleys | 55/408 |
| 3,486,314 | 12/1969 | Herrington | 55/407 |

FOREIGN PATENT DOCUMENTS

| | | | |
|---|---|---|---|
| 1047589 | 12/1958 | Fed. Rep. of Germany | 55/401 |
| 533399 | 10/1976 | U.S.S.R. | 233/31 |

*Primary Examiner*—Bernard Nozick
*Attorney, Agent, or Firm*—James E. Denny; Leonard Belkin; Cornell D. Cornish

[57] ABSTRACT

Improved separation of heavier material from a dispersoid of gas and heavier material entrained therein is taught by the method of this invention which advantageously uses apparatus embodied in an inertial separator having rotary partition means comprising wall members dividing a housing into a plurality of axially-extending through passages arranged in parallel. Simultaneously with the helical transit of a moving stream of the dispersoid through the parallel arrangement of axially-extending through passages at a constant angular velocity, the heavier material is driven radially to the collecting surfaces of the rotational wall members where it is collected while the wall members are rotating at the same angular velocity as the moving stream. The plurality of wall members not only provides an increased area of collecting surfaces but the positioning of each of the wall members according to the teaching of this invention also results in a shortened time-of-flight to the collecting surfaces.

1 Claim, 4 Drawing Figures

DISPERSOID SEPARATION METHOD AND APPARATUS

BACKGROUND OF THE INVENTION

The invention described herein was made in the course of, or under, a contract with the United States Department of Energy.

In recent years, it has become increasingly apparent that the supply of both fuel oil and natural gas will be inadequate to meet the forseeable long-term energy needs of this country, and that coal, of necessity, will become the fossil fuel of the future. A recently issued report of a government-sponsored study of energy requirements concluded that the supply of coal is abundant enough to provide the entire world with its energy requirements until at least the end of the twenty-first century. Inherent in this conclusion is the expectation that the world population will rise to ten billion people by the year 2,100 and the consumption of energy will be five times the present per capita rate.

In order to prepare for this future, innovative ways to use coal more effectively for the production of electrical power are being investigated. Of these methods, one of the most promising appears to be the combustion of powdered coal to produce high temperature gas for direct use in a gas-turbine driven electrical generator. However, one of the obstacles in the path of a rapid development of coal-fired gas-turbine electrical power generation is the need for effective removal of entrained particulate matter from the gas stream in order to limit erosion of turbine components. Because of unlike conditions, the methods and apparatus heretofore used effectively in the chemical process industry cannot be used as effectively for removal of the entrained matter from the combustion gases produced in the burning of powdered coal.

Presently available, low-cost, high-volume inertial separators, such as the cyclone separator and the like, which are otherwise suitable for the removal of particulate matter, become increasingly inefficient when the size of the particle is reduced below about ten microns in diameter. This loss of efficiency with decreasing particle size is significant, because, in the combustion of powdered coal, an appreciable fraction of the entrained particulate matter is in the range of from five to ten microns.

There are, essentially, only two variables that can be manipulated to improve the efficiency and effectiveness of separation of high-volume particle separators. The separation force is one variable and the separation area is the other variable. Thus, an inertial separator provides increased separation force, as compared with a gravitational separator, as a consequence of the increased centrifugal force acting on the heavier material. In a like manner, increasing the throughput in a cyclone separator increases the centrifugal force and generally results in more effective particle separation up to the point where pressure drop becomes prohibitive or particle reentrainment becomes limiting. An improved separation is realized in a gravitational settling chamber, without affecting throughput, by the use of recognized expedients to provide additional separation area. Such expedients include the stacking of a plurality of shallow settling trays in the chamber and increasing the length of the path traversed in going through the chamber by means of appropriate baffling.

In the removal of particulate matter from combustion gas which is intended for use in a gas turbine, expedients which increase the pressure drop may not be permissible since any increase in pressure drop degrades the energy content of the gas and may not be justified on a cost-effectiveness basis. However, innovations that increase the separation area in an inertial separator and provide a shorter time-of-flight to the collecting surfaces do appear to be justifiable and, therefore, are objects of this invention.

A somewhat different approach to improving separation efficiency in inertial separators, by increasing separation force, is recognized in the art typified by U.S. Pat. Nos. such as those numbered 2,779,434; 1,057,613; and 3,486,314, which patents employ rotational wall members to enhance separation of heavier material entrained in the gas, and thus bear a superficial resemblance to the instant invention.

The apparatus of the above-cited patents differs inherently from the apparatus of the instant invention in that the wall members provided therein do not increase the separation area, whereas the function of the plurality of radially-spaced rotational wall members of the instant invention is to provide increased separation area and a shortened time-of-flight to the collecting surfaces. Only one rotational wall member is used in the apparatus of U.S. Pat. No. 2,779,434 and U.S. Pat. No. 3,486,314, whereas in the plurality of nested rotational wall members of U.S. Pat. No. 1,057,613 all the wall members are perforated to permit the passage therethrough of the heavier material.

Additionally, the apparatus of each of the cited patents employs longitudinal ribs, or fins, to divide a longitudinal passage into a plurality of azimuthally-adjacent non-communicating cells. The longitudinal passage of the invention herein disclosed is not divided into such cells.

Turbulence, which is recognized to hinder efficient separation of entrained matter, is significantly increased by the cellular construction of the above-cited devices whenever there exists a mismatch between the angular velocity of the fins and the angular velocity of the gas stream passing through the apparatus. It is thus another object of this invention to substantially reduce the generation of turbulence in the gas stream passing through the apparatus of this invention.

SUMMARY OF THE INVENTION

Effective, low-cost, high-volume removal of particulate matter from combustion gas and the like is realized in an inertial separator by the new and novel provision of increased separation area and a shortened time-of-flight to the collecting surfaces. The efficiency of separation of heavier material from entrainment in a gas stream moving in a helical path within a cylindrical housing is substantially increased by providing inside the housing a plurality of rotary impervious wall members rotationally driven at the same angular velocity as the moving gas stream. The impervious wall members define a plurality of axial through passages arranged in parallel for the non-turbulent movement of the gas stream while simultaneously increasing the area for the collection of heavier material removed from the gas stream and no longer subject to its influence. The location of the wall members defining each passage can be selected prior to construction of the apparatus so as to increase the probability of separation of a selected minimum size particle by providing for the selected particle size a selected time-of-flight to the collecting surfaces of the wall members which time-of-flight is shorter than the time required for the gas stream to traverse a through passage from end to end.

In the practice of the operation of this invention, a moving stream of a dispersoid of a heavier material entrained in gas is given an angular component of velocity prior to its entrance into a plurality of axial through passages arranged in parallel within a cylindrical housing, each of the through passages defined by wall members rotationally driven at the same angular velocity as the gas stream. As a consequence of the angular velocity component of the gas stream, the heavier material is driven radially to the plurality of wall members, with substantial reduction of induced turbulence, to be captured on the collecting surfaces of the wall members with substantial absence of disturbance of the type caused by relative differences in motion between the entrained matter and the wall members.

A more complete and better understanding of this invention may be had by reference to the description of the presently preferred embodiments when taken together with the accompanying drawing.

BRIEF DESCRIPTION OF THE DRAWING

In the drawing, wherein like reference characters refer to like elements.

DESCRIPTION OF THE PREFERRED EMBODIMENTS

Basic to any appreciation and comprehension of the processes involved in the separation of entrained matter from a moving stream of a gaseous dispersoid, is the realization that the separation of any one discrete element of the entrained heavier material takes place only when that element approaches a collecting surface under conditions which preclude elastic rebound and which permit entry into a quiescent zone close to the surface, commonly called a boundary layer, where the element of heavier material is trapped and effectively shielded from the influence of the gas stream. The height of the boundary layer associated with a surface and a gas in relative motion parallel therewith is an inverse function of the difference in velocity between surface and gas. Since a thicker boundary layer better shields the collected material from the influence of the gas stream, which influence may include the effects of vortices, eddies and the like, minimization of the velocity difference between surface and gas is necessary in order to maximize the collection efficiency of a surface.

For any specified applied force of separation, and absent turbulence in the gas stream, the properties of the gaseous dispersoid, and more particularly the size distribution of the dispersed matter, determine the rate at which each element of the entrained matter approaches the boundary layer. Each size fraction will have its own rate of approach to the boundary layer. In existing prior art inertial separators, even where the actual applied force of separation has been enhanced by centrifugal force to that of several hundred times the normal gravitational force, the rate of approach is insufficient to cause elastic rebound of the entrained matter being separated. The problem is not of rebound, but of insufficient residence time within the separator to allow approach to and penetration of the boundary layer. In the prior art devices this problem results from the fact that the residence time within the separator is significantly less than the time-of-flight required for a specified element of entrained matter to reach a collecting surface.

In the light of this discussion and the description of the presently preferred embodiments of the invention which follow, it will be appreciated by those skilled in the art that the objects of this invention are achieved by the provision of a plurality of collecting surfaces that have a thicker boundary layer than heretofore found in inertial separators and that the plurality of collecting surfaces is positioned such that the time-of-flight to a collecting surface is shortened. Thus the probability for a selected element of entrained material to approach to and penetrate the boundary layers is significantly increased without increasing the residence time within the separator or increasing the pressure drop of the gas stream.

Referring now to the drawing, wherein FIG. 1 depicts a sectionalized view of a presently preferred embodiment of this invention arranged on a vertical axis with generally cylindrical housing 10 having an inlet 12, at the lower end thereof, for entry of a stream of a gaseous dispersoid from which entrained matter is to be separated, and an exit 14, at its upper end, for cleaned gas. Inlet 21 is arranged as is shown in FIG. 2 so that the gas stream enters housing 10 tangentially with an angular component of velocity around the axis of housing 10, said axis concentric with the axis of shaft 16 shown supported in suitable bearings 18. Shaft 16 can be provided with a pulley 20 coupled to driving means not shown by belting and the like to rotationally drive shaft 16 with an angular velocity that is matched to the angular velocity component of the gas stream within housing 10. A plurality of imperferate wall members 22, shown for ease of illustration as being uniformly spaced apart and supported by a plurality of radial struts or support members 24 suitably attached to shaft 16, define a plurality of annular cocentric axial passages 26 arranged in parallel for the helical movement of the gas stream therethrough. The outermost of wall members 22 can be provided with an outwardly turned flange 28 at its lower extremity and a similar flange 30 at its upper extremity to closely approach the cylindrical wall of housing 10 thereby limiting passage of gas therebetween. Hopper 32 is located at the lower end of housing 10 to receive the heavier material that has been separated from the gas stream and retained upon the collecting surfaces of wall members 22. Means and methods for the transfer of the heavier material from the collecting surfaces to hopper 32 will be described subsequently. Material in hopper 32 is removable as desired through spigot 34 which may be provided with a selectively operable closure means not shown.

In the operation of the embodiment of the inertial separator illustrated in FIG. 1 and FIG. 2, a moving stream of a dispersoid of heavier material entrained in a gas enters housing 10 through tangential inlet 12 at a preselected volumetric flow rate selected to generate an angular velocity component sufficient to produce a centrifugal force acting to separate said heavier material from said gas while the moving stream moves upwardly through passages 26, in parallel flow at substantially constant said angular velocity. Shaft 16 is rotated in the same rotational sense as the rotation of the gas stream at substantially the same angular velocity, either by predesign, or under control of suitable sensing and drive speed-control equipment. Suitable sensing equipment could include a directional hot-wire anemometer with slip-ring feed-through and suitable speed-control equipment includes variable-speed motors and various types of infinitely-variable mechanical drive devices.

Figure 3:
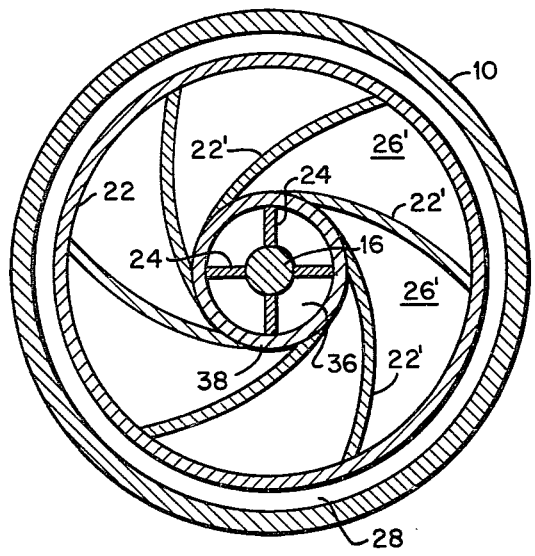
FIG. 3 is a cross-sectional view of an alternate arrangement for the rotationally-driven wall members.

Ideally, the conduit for the moving stream coming to the inlet should have a long straight section without bends, or the interior of the conduit should be provided with straightening vanes, as is known in the art, in order substantially to reduce the turbulence of the gas stream and to make the velocity more nearly uniform across the width of the moving stream. When the moving stream of dispersoid enters housing 10 under conditions of minimal turbulence, the transition to helical flow is smoother than when the rotational wall members 22 have to function in the manner of straightening vanes to quiet any pre-existing turbulence.

As a consequence of the co-rotation in the same directional sense of the wall members 22 and the gas stream at substantially the same angular velocity, the moving stream passes upwardly through passages 26 with substantial absence of turbulence while the heavier material is simultaneously driven radially outwards by centrifugal force towards the inwardly-facing collecting surfaces of wall members 22 by the forces resulting from said angular velocity and no other.

Whenever a radially-moving component element of the heavier material enters the quiescent zone, or boundary layer, associated with the collecting surface of a wall member, that element of the heavier material is effectively separated from the gas stream by being removed from the influence of the gas stream and cannot exit housing 10 through exit 14.

It should be understood also that the radial velocity, or separation velocity, of each discrete element of the heavier material is the resultant of a balance of forces acting upon it. The net separation force, which is substantially the centrifugal force, acts in one direction and is balanced by an oppositely-directed frictional, or drag, force. The centrifugal force acting upon the heavier material is a linear function of the radial distance from the axis of housing 10 as a consequence of the fact that the gas stream moves through the separator with a substantially invariant angular velocity component. Since the magnitude of the frictional force is not a simple linear function of the radial distance from the axis but a more complex function, the resultant radial velocity, or separation velocity, cannot be a linear function of the radial distance from the axis. However, despite the absence of linear relationship, it can be generalized that the separation velocity for all particles of entrained heavier material is lowest in the region close to the axis and is greatest at the outermost periphery.

In light of the above discussion of the variation of separation velocity as a function of radial distance from the rotational axis, it will become immediately apparent to those skilled in the art that the uniform spacing of wall members 22 of FIG. 1 and FIG. 2, although providing a shortened time-of-flight and improved separation efficiency when compared with prior art separators, is less than optimal for the separation of any one specified size element of the entrained material. To be optimally arranged for equal time-of-flight in each region of collection, the spacing of the wall members 22 in the vicinity of the axis should selected to provide a shorter flight path by being more closely spaced than shown in the drawing so as to provide passages 26 of reduced radial dimension near the axis, whereas the wall members more distant from the axis should be spaced progressively further apart so as to provide passages 26 of progressively wider radial dimension further from the axis. Such a modified spacing of the wall members 22 will result in a substantially equal time-of-flight radially across every one of the passages 26 for a selected critical size particle of entrained heavier material when the spacing of wall members 22 is in accord with the results of testing of the dispersoid, which testing can be conducted for each specific application in a routine manner. Absent such testing, and using a uniform spacing of wall members 22, the separation efficiency of the inner wall members may be less than optimal. However, even with the uniform spacing of wall members, the separation efficiency will be superior to prior art inertial separators of the same volumetric capacity as a consequence of the shortened time-of-flight to the collecting surfaces.

FIG. 3, a cross-sectional view similar to that of FIG. 2, illustrates another presently preferred embodiment of a partition means for dividing the interior of housing 10 into a plurality of axially-extending through passages arranged in parallel, the passages 26' being defined by a plurality of imperforate wall members 22' whose radial separation from the axis of rotation increases in the azimuthal direction of the rotation of the axis. Since the separation of entrained material resultant from the more centrally located wall members is fractionally small when compared to that resultant from wall members located where the centrifugal force is more intense, region 36 is physically isolated from passages 26' by means of impervious barrier 38 spaced from and cocentric with shaft 16. When it is desired to have a straight-through movement of the gas stream through a housing having an inlet and an exit at opposite ends thereof, as in the embodiment of FIG. 1, region 36 can be completely blanked off, as is known in the art. When it is considered desirable to utilize the gas-flow pattern common to the cyclone separator, wherein there is a flow-reversal within the housing, the inlet and exit for the moving stream of gas can both be located at the same end, preferably the upper end, and an axially-located exit conduit, communicating with the interior of region 36, can be positioned so as to assure that the flow of the moving gas stream within the housing is downwardly through the passages 26' in parallel flow before reforming and proceeding upwardly as a single stream in a helical path around the axis in region 36 and thence out the exit.

As shown in FIG. 3, the relative positioning of the wall members 22' is such that the radial dimension of each of the passages 26' varies as a function of azimuth because the distance separating each of the wall members from the axis varies as a function of azimuth. This arrangement of the passages 26', with the radial extent of the passage a function of radial distance from the axis, more closely approximates the desired ideal criterion of substantially equal time-of-flight radially across every one of the passages, and, therefore, can be used with a gaseous dispersoid for which experimental test data have not been obtained to give a better than average separation of the heavier material entrained therein. A further consequence of the arrangement of wall members used in the embodiment of FIG. 3 is that the heavier material collected upon the collecting surfaces of the wall members is acted upon by the gradient of centrifugal force resulting from the azimuthal change in radial distance from the axis to translocate the collected material azimuthally towards the outer periphery of the wall members, thereby concentrating the collected material for subsequent removal, as will be discussed.

Figure 4:
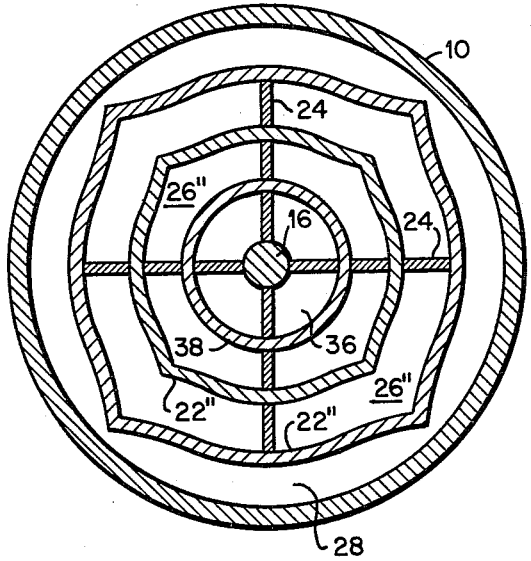
FIG. 4 is a cross-sectional view of another alternate arrangement for the rotationally-driven wall members of the separator of this invention.

Azimuthal translocation of the collected heavier material along the wall members is provided in the embodiment of FIG. 4 wherein the passages 26" are annular and cocentric with the axis of shaft 16. However, in this embodiment, each one of wall members 22" is not every where equidistant from shaft 16 but has a radial separation from the axis of rotation which is a periodic function of azimuth, as shown. The cross section of each of the wall members 22" is a closed curvilinear figure having cusps and a rotational symmetry. Axial region 36 is isolated from passages 26" by impervious barrier 38 for the reasons previously disclosed. In this, as in the previously discussed embodiments, the radial dimension of each of the passages is substantially invariant in the axial direction.

Figure 1:
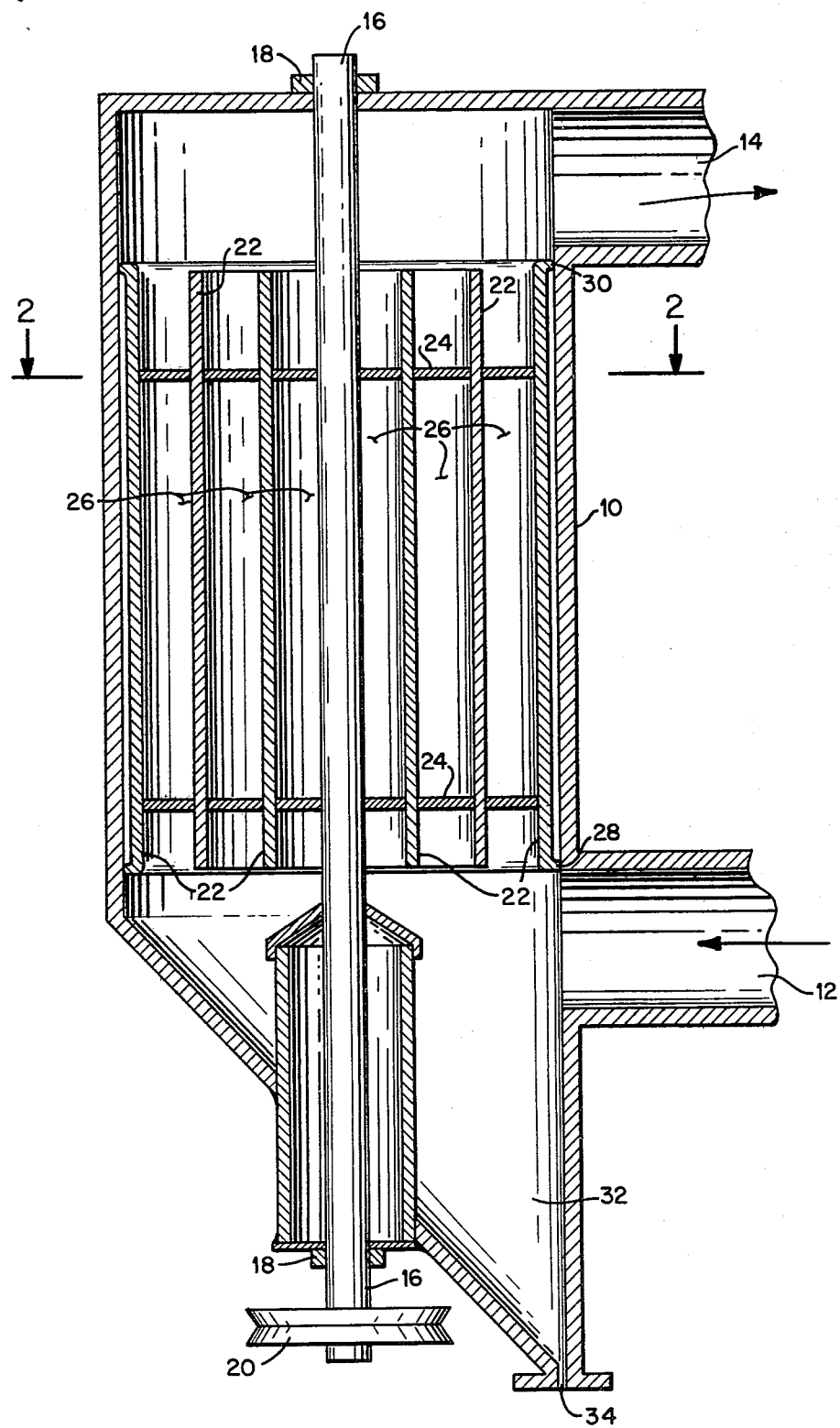
FIG. 1 is a sectional view of a presently preferred separator in accordance with the invention.
Figure 2:
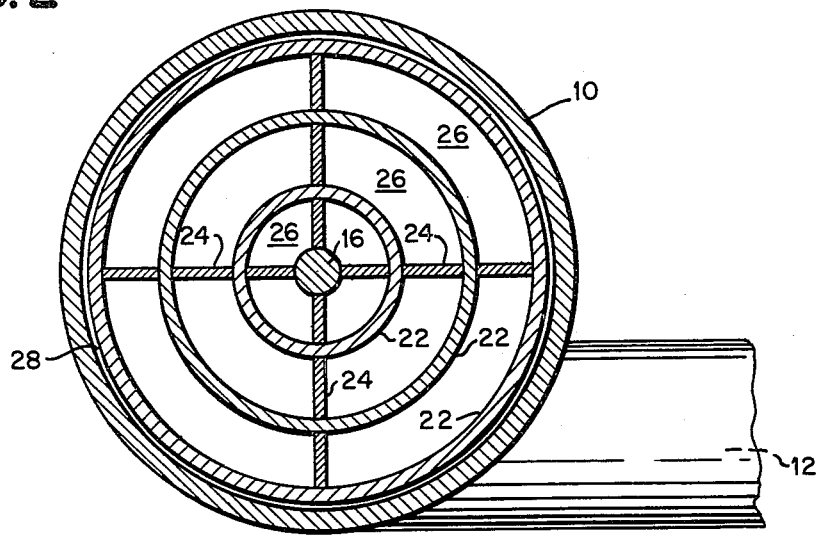
FIG. 2 is a view of the separator of FIG. 1 taken along section line 2—2 of FIG. 1.

When it is desired to remove the collected heavier material from the wall members of any one of the embodiments of the inertial separator herein disclosed, it is possible to do so without the use of elaborate mechanisms, through use of a suitable means, as for example the vibrator depicted in U.S. Pat. No. 2,779,434, to vibrate the wall members after the gas flow and rotation have been stopped, thereby causing the collected material to fall into an appropriately positioned hopper, as hopper 32 in FIG. 1. However, in the embodiments of both FIG. 3 and FIG. 4, since the collected material on wall members 22' and 22" has been translocated thereon and concentrated more-or-less in a localized axial region of each of the wall members, it becomes feasible and even desirable to provide a suitable simple mechanism for the continuous or intermittent mechanical transfer, as desired, of the collected material from the wall members without interruption of the operation of the separator. As an example, an open-trough screw-conveyor can be located at each locus of maximum radius of the wall members. The trough would have suitable openings to receive the collected material being translocated azimuthally. An appropriate rotation of the screw will then transfer the collected material axially along the trough and into a hopper. Various methods for actuation of the screw will occur to those skilled in the art. One such preferred mechanism is dependent upon a periodic reciprocal linear movement of a suitably threaded shaft member, as is familiar from its use in a child's toy top which is made to spin in an identical manner. The reciprocal linear movement can be obtained readily by a spring-biased interaction of the shaft member with an appropriately shaped annular cam surface mounted in the housing.

It should be understood that, whereas the presently preferred embodiments of this invention have been illustrated in the figures of the drawing as having a vertical axial configuration, as is commonly used for cyclone separators and the like, there is no fundamental reason why the inertial separator of this invention cannot be used also in a horizontal configuration, provided of course, that the appropriate non-critical changes are made, as in the housing, hopper, and gas inlet and outlet, to accommodate the alteration of the axial direction from vertical to horizontal.

Further, it should be understood, that whereas this specification has been written within the context of a single end-use with the object to provide an inertial separator for the improved separation of a specified particle size fraction from a gaseous dispersoid resulting from the combustion of powdered coal, the teachings of this invention are equally applicable to the separation of both mechanical dispersoids and condensed dispersoids of other particulate matter as well as to the separation of fumes and mists.

The expression, time-of-flight, is used in this specification to mean the period of time that would be required for a specified element of entrained material which is moving outwardly along a radius to traverse the radial distance between a first position defined by the exterior surface of a wall member and a second position defined by the interior surface of the next wall member in its flight path.

Now, having described in detail, and with candor, the invention and its manner of use in terms of the presently preferred embodiments as exemplars, as required by the statute, it will be apparent to those skilled in the art to which this invention pertains that innumerable variations of the structural elements which comprise this invention can be made without deviating from the teaching nor departing from the scope of this invention as limited by the appended claims, wherein

What is claimed is:

1. Apparatus for removing entrained particulate matter in the range of from five to ten microns from combustion gases produced in the burning of powdered coal, comprising:
    means defining a cylindrical housing having an elongated vertical axis;
    partition means, comprising a plurality of impervious wall members, for dividing the interior of said housing into a plurality of axially-extending coextensive, substantially unobstructed, annular and concentric through passages around in parallel forming annular collecting surfaces;
    inlet means for directing tangentially into the lower end of said housing and said passages a flow of said combustion gases at a selected angular velocity sufficient to produce a centrifugal force on said entrained matter capable of driving said matter radially;
    means for rotating said partition means around said axis at substantially said angular velocity so as to minimize the velocity difference between said gases and said surfaces and forming boundary layers of sufficient thickness to shield collecting material from the influence of the flowing gases to permit collection of substantially all of said entrained particulate matter;
    hopper means located within said housing below said inlet means for removing particulate matter collect on said surfaces when flow through said apparatus is terminated; and
    outlet means at the upper end of said housing for carrying away said gases after removal of said particulate matter.

* * * * *